(12) United States Patent
Shaath et al.

(10) Patent No.: US 7,392,234 B2
(45) Date of Patent: Jun. 24, 2008

(54) METHOD AND SYSTEM FOR ELECTRONIC FILE LIFECYCLE MANAGEMENT

(75) Inventors: Kamel Shaath, Kanata (CA); Yaqun Fu, Nepean (CA); Vinay Parthasarathy, Ottawa (CA); Alexel Jelvis, Nepean (CA); Abel L. Liyansky, Ottawa (CA)

(73) Assignee: KOM, Inc., Ottawa, Ontario (CA)

( * ) Notice: Subject to any disclaimer, the term of this patent is extended or adjusted under 35 U.S.C. 154(b) by 497 days.

(21) Appl. No.: 09/665,065

(22) Filed: Sep. 19, 2000

(65) Prior Publication Data
US 2006/0010150 A1    Jan. 12, 2006

Related U.S. Application Data

(63) Continuation-in-part of application No. 09/313,181, filed on May 18, 1999, now Pat. No. 6,438,642.

(51) Int. Cl.
G06F 17/60    (2006.01)

(52) U.S. Cl. ............................. 707/1; 705/1

(58) Field of Classification Search ............ 705/1, 705/7, 10; 707/1, 204, 104.1
See application file for complete search history.

(56) References Cited

U.S. PATENT DOCUMENTS

| | | | |
|---|---|---|---|
| 4,989,206 A | 1/1991 | Dunphy, Jr. et al. |
| 5,193,184 A | 3/1993 | Belsan et al. |
| 5,276,867 A | 1/1994 | Kenley et al. |
| 5,287,504 A | 2/1994 | Carpenter et al. |
| 5,317,728 A | 5/1994 | Tevis et al. |
| 5,347,628 A | 9/1994 | Brewer et al. |
| 5,367,698 A | 11/1994 | Webber et al. |
| 5,379,423 A | 1/1995 | Mutoh et al. |
| 5,495,619 A | 2/1996 | May et al. |
| 5,584,008 A | 12/1996 | Shimada et al. |
| 5,751,287 A | 5/1998 | Hahn et al. |
| 5,771,354 A | 6/1998 | Crawford |
| 5,832,522 A | 11/1998 | Blickenstaff et al. |
| 5,838,326 A | 11/1998 | Card et al. |
| 5,881,229 A | 3/1999 | Singh et al. |
| 5,936,624 A | 8/1999 | Lisle et al. |

(Continued)

FOREIGN PATENT DOCUMENTS

EP    0 515 073    11/1992

OTHER PUBLICATIONS

Mangold, Greg, "Basic architecture of HSM sets it apart from backup", Computer Technology Review, Fall 1994, p. 58.*

(Continued)

*Primary Examiner*—C. Luke Gilligan
(74) *Attorney, Agent, or Firm*—Venable LLP; Ralph P. Albrecht

(57) ABSTRACT

A method and system for managing a file lifecycle is disclosed. The method incorporates a virtual file cabinet having virtual drawers. Files are moved from drawer to drawer throughout their lifecycle in accordance with policies associated with each drawer. The files are moved automatically and as such, a file's lifecycle is managed from file creation to file deletion in an automated fashion. By using an archiving device such as magneto optical storage media, the files are automatically moved to their final archived location in an archiving drawer once certain policies of their present drawer are met. The system is an electronic system employing the inventive method.

59 Claims, 7 Drawing Sheets

U.S. PATENT DOCUMENTS

| | | | |
|---|---|---|---|
| 5,969,720 | A | 10/1999 | Lisle et al. |
| 5,991,753 | A | 11/1999 | Wilde |
| 6,101,506 | A | 8/2000 | Ukai et al. |
| 6,148,369 | A | 11/2000 | Ofer et al. |
| 6,240,421 | B1 * | 5/2001 | Stolarz .................... 707/102 |
| 6,266,679 | B1 * | 7/2001 | Szalwinski et al. .......... 707/204 |
| 6,381,619 | B1 | 4/2002 | Borowsky et al. |
| 6,438,642 | B1 * | 8/2002 | Shaath .................... 711/100 |
| 2002/0030100 | A1 | 3/2002 | Katayanagi et al. |
| 2002/0046320 | A1 | 4/2002 | Shaath |
| 2002/0069214 | A1 | 6/2002 | Smith et al. |
| 2002/0070971 | A1 | 6/2002 | Brown et al. |
| 2002/0111956 | A1 | 8/2002 | Yeo et al. |
| 2005/0055211 | A1 | 3/2005 | Claudatos et al. |

OTHER PUBLICATIONS

Uvelli, Dave, "The role of tape-based storage in Storage Area Networks", Computer Technology Review, Jun. 2000, p. 56.*

Anonymous, "Daticon Systems unveils Dati-Share, Virtual Partner", Information Today, Feb. 1999, vol. 16, No. 2, p. 54.*

Gable, Records Management for Electronic Documnets, Oct. 1997, ARMA Records Management Quarterly, pp. 15-19.*

Documentum Launches EDMA 98, Jul. 1998, PR Newswire.*

Schoeniger, Data pecking order, Jan. 1994, DEC Professional, vol. 13, No. 1, pp. 24-33.*

Jason Gait, "The Optical File Cabinet: A Random-Access File System for Write Once Optical Disks," Computer, Jun. 1988, pp. 11-22.

Jason Gait, "Phoenix: A Safe In-Memory File System," Communications of ACM, vol. 33, No. 1, Jan. 1990, pp. 81-86.

Jason Gait, "A Checkpointing Page Store for Write-Once Optical Disk," IEEE Transactions on Computers, vol. 39, No. 1, Jan. 1990, pp. 2-9.

Terry Laskodi, Bob Eifrig, Jason Gait, "A UNIX File System for a Write-Once Optical Disc," Summer USENIX '88, San Francisco, Jun. 20-24, pp. 51-60.

Baird, et al.; "Distributed Information Storage Architecture"; Mass Storage Systems, 1993; Putting all That Data to Work. Proceedings, Twelth IEEE Symposium on Monterey, CA USA Apr. 26-29, 1993, Los Alamitos, CA, USA, IEEE Comput. Soc, US; Apr. 26, 1993; pp. 145-155.

Foster, et al.; "Renaissance: managing the network computer and its storage requirements"; Procceddings of The Symposium on Mass Storage Systems. Monterey, Oct. 7-10, 1991, Los Alamitos, IEEE Comp. Soc. Press, US, vol. Symp. 11, Oct. 7, 1991; pp. 3-10.

Bedoll, et al., "The importance of metadata in mass-storage systems"; Mass Storage Systems, 1990. Crisis in Mass Storage. Digest of Papers.; Tenth IEEE Symposium on Monterey, CA USA May 7-10, 1990, Washington, DC, USA, IEEE Comput. Soc. PR, US, May 7, 1990; pp. 111-116.

Lanzatella, et al.; "Storage Management issues for Cray Research" Mass Storage Systems, 1990. Crisis in Mass Storage. Digest of Papers., Tenth IEEE Symposium on Monterey, CA, USA May 7-10, 1990, Washington, DC, USA, IEEE Comput. Soc. PR, US, May 7, 1990, pp. 176-181.

Peter Druschel and Antony Rowstron; "Past: A Large-Scale, Persistent Peer-to-Peer Storage Utility"; date: after Nov. 2001—received from client on Jan. 3, 2002.

* cited by examiner

VIRTUAL CABINET SCHEME

FILE LIFE CYCLE MANAGEMENT

*Goal:* To control a file from its inception, throughout all the stages of its life, to the end of its useful existence, safely ensuring information availability and simultaneously providing a cost effective storage place, according to predefined administration policies.

The File Life Cycle will be controlled by Virtual Cabinets. A Virtual Cabinet will define the whole set of policies for governing files inside a disk subdirectory.
The cabinets will store files in Virtual Drawers. All these elements exist in a virtual storage space: a Virtual Volume.

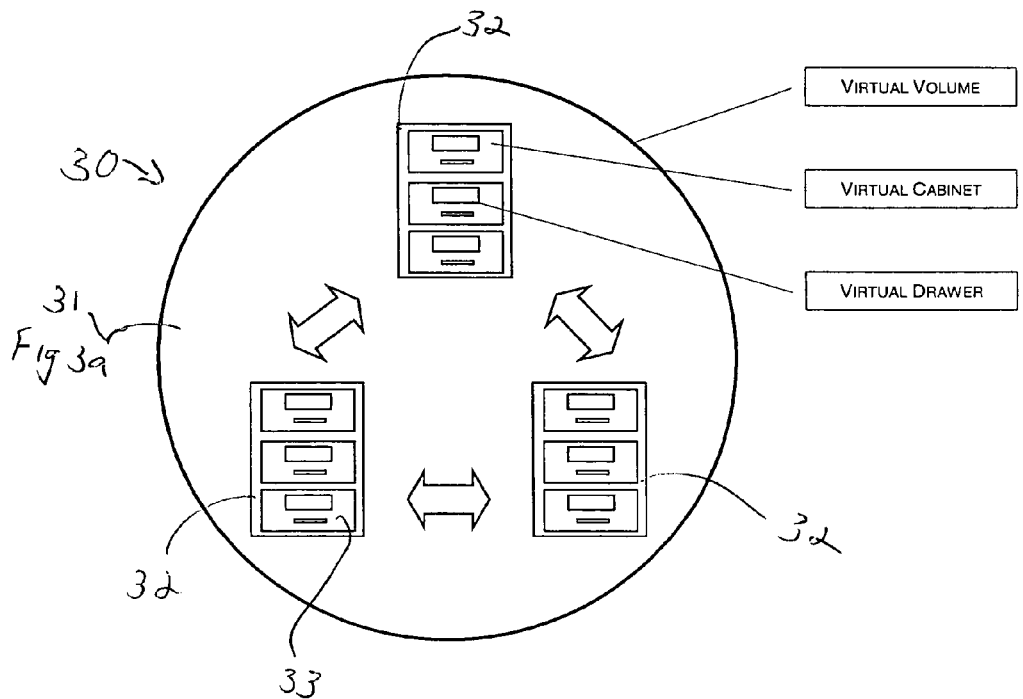

Files will be stored inside of Virtual Drawers. These drawers can expand and shrink dynamically and will be constituted by a homogeneous media type. Besides storage, Virtual Drawers can be defined for extra purposes like caching, redundancy control, file recycling and offline management.

Each Virtual Cabinet will contain the general policies to be applied for the files under its control; in turn, each Virtual Drawer in a cabinet will include the rules for administering files in its domain.

Furthermore, a Virtual Drawer can be shared by many Virtual Cabinets.

METHOD AND SYSTEM FOR ELECTRONIC FILE LIFECYCLE MANAGEMENT

This application is a continuation-in-part of application Ser. No. 09/313,181, filed May 18, 1999, now U.S. Pat. No. 6,438,642 to Shaath, entitled "File-based Virtual Storage File System, Method and Computer Program Product for automated file Management on Multiple File system Storage Devices."

CROSS-REFERENCE TO RELATED APPLICATIONS

This application is related to the following co-pending, commonly assigned applications: U.S. patent application Ser. No. 09/313,181, entitled "FILE-BASED VIRTUAL STORAGE FILE SYSTEM, METHOD AND COMPUTER PROGRAM PRODUCT FOR AUTOMATED FILE MANAGEMENT ON MULTIPLE FILE SYSTEM STORAGE DEVICES", filed on May 18, 1999, and which has issued as U.S. Pat. No. 6,438,642 on Aug. 20, 2002; U.S. patent application Ser. No. 09/267,788, entitled "METHOD OF DETERMINING AND STORING INDEXING DATA ON A SEQUENTIAL DATA STORAGE MEDIUM FOR SUPPORTING RANDOM ACCESS OF DATA FILES STORED ON THE MEDIUM", filed on Mar. 15, 1999, and which has issued as U.S. Pat. No. 6,349,294 on Feb. 19, 2002; U.S. patent application Ser. No. 09/267,787, entitled "METHOD AND SYSTEM FOR PROVIDING RESTRICTED WRITE ACCESS TO A STORAGE MEDIUM", filed on Mar. 15, 1999, and which has issued as U.S. Pat. No. 6,336,175 on Jan. 1, 2002; U.S. patent application Ser. No. 09/364,074, entitled "DRIVE NAMES", filed on Jul. 30, 1999, and which has issued as U.S. Pat. No. 6,370,545 on Apr. 9, 2002; U.S. patent application Ser. No. 10/032,467, entitled "METHOD AND SYSTEM FOR PROVIDING RESTRICTED ACCESS TO A STORAGE MEDIUM", filed on Jan. 2, 2002, and which has issued as U.S. Pat. No. 6,654,864 on Nov. 25, 2003; and U.S. patent application Ser. No. 10/067,916, entitled "METHOD OF DETERMINING AND STORING INDEXING DATA ON A SEQUENTIAL DATA STORAGE MEDIUM FOR SUPPORTING RANDOM ACCESS OF DATA FILES STORED ON THE MEDIUM", filed on Feb. 8, 2002, and which has issued as U.S. Pat. No. 6,546,384 on Apr. 8, 2003.

FIELD OF THE INVENTION

The invention relates generally to storage devices for storing electronic data and more particularly to virtual storage devices for electronic file lifecycle management.

BACKGROUND OF THE INVENTION

In the past, files were stored as paper documents within a physical file. A physical file has a physical lifecycle from file creation to file destruction. Commonly, during this process, the file goes through the process of file building, file reference, file non-use, and file archiving. These steps often occur in that order though this need not be the case.

Because of the way files are maintained within present day computer systems, it is often difficult to retrieve files when lost. This is not because of backup failures and so forth, so much as due to poor organization and non-standard file lifecycle management. Typically, files are relocated manually which necessitates human interaction and the new location of the file has to be manually recorded. This process is prone to errors since it relies heavily on the individual to update the current location. For example, it is often only a guess when a specific file is archived. The name and location of the file may also be inexact. This leads to difficulties in accessing data once archived. It also leads to difficulty in accessing data during normal use.

The adoption of the concept of electronic file storage has increased the demand for storage on an ongoing basis. Huge networked storage repositories, which were once considered as unattainable, are now more widely available. The potential existence of such systems raises many questions of how to organize and coordinate were the files will be stored and for how long. These issues have plagued system administrators through out the evolution of the electronic age, and will continue in the future as the demand for electronic data increases. In most organizations their storage requirements are evolving at an exponential rate exceeding all expectations. This phenomenon along with the ongoing advancements in storage technologies that are occurring at a very fast rate are making existing storage repositories obsolete shortly after their deployment.

OBJECT OF THE INVENTION

In order to overcome these and other limitations of the prior art, it is an object of the present invention to provide a method and system for automatic management of electronic file lifecycles.

SUMMARY OF THE INVENTION

The embodiment of this invention enables organizations to salvage their existing investments in current storage technologies while allowing the adoption and incorporation of up and coming technology in one comprehensive system. Existing systems that are currently in production may be utilized to maintain some data while the newer more efficient storage systems may maintain the most current data. The invention supports incorporation of the widest variety of storage technologies and systems into a cohesive and homogeneous storage system that can expand and incorporate newer storage technologies as they become available and continue to meet the ever expanding demand for storage.

Typically, the file lifecycle allows the file to be accessed throughout its existence, regardless of where it is located within the network. A file may exist on any of the storage components or servers that comprise a virtual storage space. All relevant information regarding file management policies is maintained and enforced according to the invention for the entire file lifecycle. Several instances of a file may exist within a virtual space allowing the overall system to perform such tasks as load balancing, high availability, replication, backup and mirroring. This implies that for the entire lifespan of the file it will remain accessible.

According to the present invention there is provided a method of managing a file lifecycle comprising the steps of:

storing the file on a storage medium having associated therewith a set of policies relating to file storage locations;

determining from the associated policies when the file is to be moved;

moving the file to another storage location within a same or different storage medium when the file is to be moved.

According to another embodiment of the invention there is provided a method of managing a file lifecycle comprising the steps of:

providing a virtual storage medium having a plurality of storage media associated therewith and having associated therewith a set of policies relating to file storage locations within the storage media;

storing the file on a storage medium within the virtual storage medium; at intervals, determining from the associated policies actions dictated by the policies for performance on the files;

performing the dictated actions on the file.

According to another embodiment of the invention there is provided a method of managing a file lifecycle comprising the steps of:

providing a virtual cabinet having a plurality of virtual drawers, each virtual drawer associated with at least a storage medium and a single drawer associated with storage media of a similar nature;

providing a plurality of policies, a policy associated with each virtual drawer; storing the file in a virtual drawer by storing the file on at least a storage medium associated with the virtual drawer;

at intervals, determining from the policy associated with the virtual drawer an action dictated by the policy; and, performing the dictated action on the file.

The process of relocating a file could be triggered externally by an administrator, or be triggered by usage policies such as high & low watermarks or by a predefined event or interval.

According to yet another embodiment of the invention there is provided a method of managing a file lifecycle comprising the steps of:

providing a virtual cabinet having a plurality of virtual drawers, each virtual drawer associated with at least a storage medium and a single drawer associated with storage media of a similar nature;

providing a plurality of policies, general policies on a virtual cabinet basis as well as policies associated with each virtual drawer;

storing the file in a virtual drawer by storing the file on at least a storage medium associated with the virtual drawer;

upon receiving an access request to access the file, determining from the policy associated with the virtual drawer an action dictated by the policy;

performing the dictated action on the file.

Advantageously, maintaining an index of the relevant information to access the files regardless of the location allows a single file to have several extents potentially spanning across several of the storage components within a virtual drawer or across several virtual drawers within a virtual cabinet. The entire file remains accessible and appears to the user completely intact as one whole file even though it might be spliced across different partitions on different servers, but this need not be so.

BRIEF DESCRIPTION OF THE DRAWINGS

The invention will now be described in conjunction with the drawings in which:

FIG. 3a is a simplified diagram of a visualization of a virtual volume comprising three virtual filing cabinets;

FIG. 3b is a simplified block diagram of physical storage devices relating to the virtual volume of FIG. 3a;

DETAILED DESCRIPTION OF THE INVENTION

Figure 1:
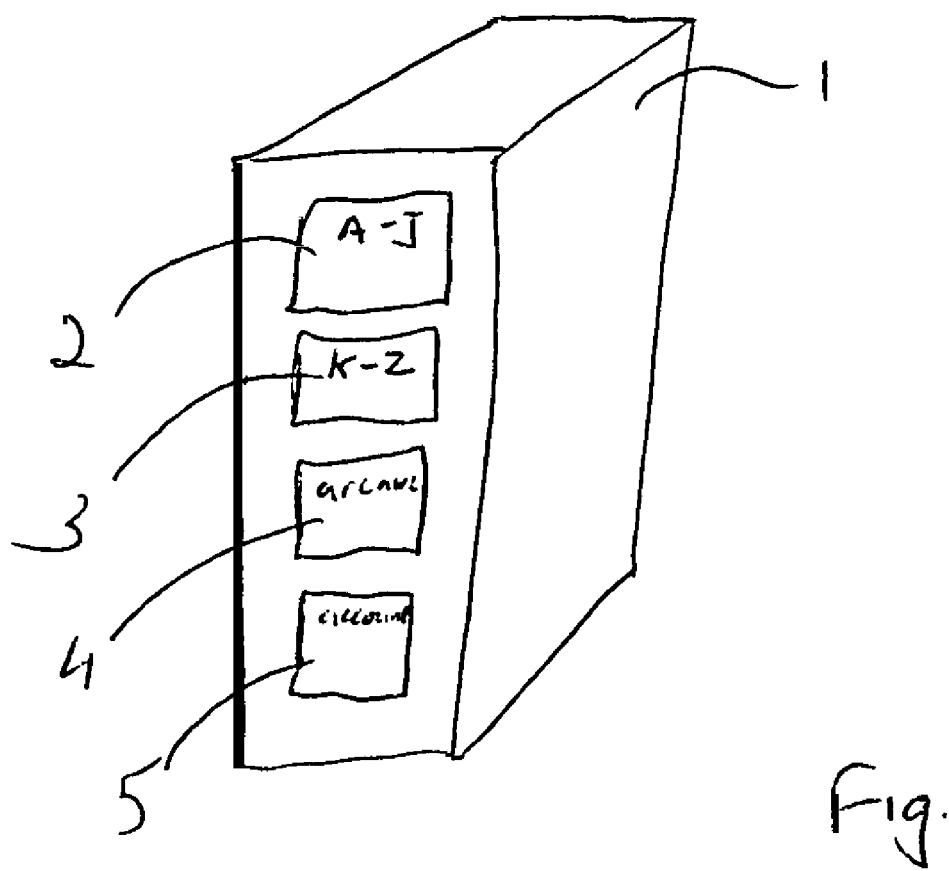
FIG. 1 is a simplified diagram of a filing cabinet.

Referring to FIG. 1, a simplified diagram of a file cabinet 1 is shown. The drawers 2, 3, 4, and 5 each hold a finite number of files. The drawers are of equal size and typically, each drawer is labeled, as shown, to indicate its contents. The file cabinet 1 contains files organized into A-J (drawer 2), K-Z (drawer 3), archives (drawer 4) and accounting (drawer 5). Such organization methods and filing systems are well known and their use in offices is widespread.

As noted above, the concept of file folders has been adopted for use in graphical user interfaces. The file folder is a graphical representation of a directory. A file folder may contain documents or further file folders and so forth. This is seen in the Macintosh® operating system and in Windows® operating systems. The use of these file folders is merely a convenient visualization tool for users. In actual practice, a single file folder is rarely comprised of many nested file folders and so forth.

Figure 2:
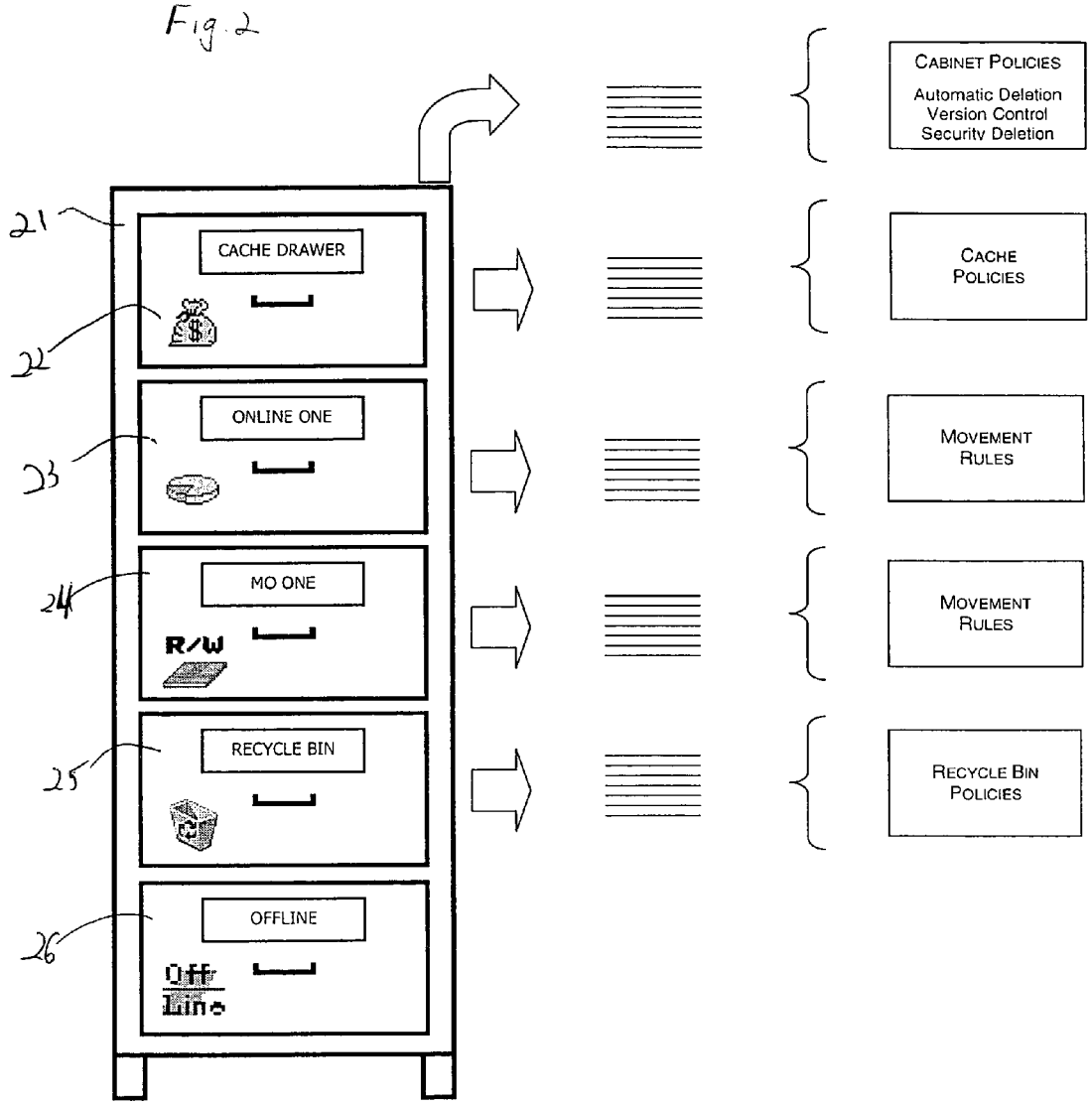
FIG. 2 is a simplified diagram of a virtual filing cabinet.

Referring to FIG. 2, a simplified diagram of a virtual file cabinet 21 used as an aid for visualizing a computer file system is shown. The virtual cabinet 21 has a number of drawers, each labeled to reflect their contents. The drawers are indefinite in size and may span more than a single physical storage medium. Some drawers may reflect storage media types as opposed to permanent storage. For example, the drawer 22 is a cache. The cache is shown labeled "cache drawer" but may in fact be labeled disk surface or to be filed or so forth. The drawer 23 is a storage medium that is currently available. Because the system uses virtual volumes, it is possible that a storage medium is offline. Of course, even when virtual volumes are not used, a network drive may be offline at a particular time. Drawer 24 relates to a magneto-optical drive for storing large volumes of data on removable media. Drawer 25 relates to a recycle bin or trash where deleted files are stored prior to being permanently erased. Finally, an offline media drawer 26 is a placeholder that retains information about for all components of the specific virtual cabinet that are currently unavailable and may be inaccessible. An Offline Media Drawer contains information related to all removable media that is not currently accessible. Of course, any drawer can be in an unavailable state due to a network or hardware related problem. Each Drawer has its own independent operational status that reflects its current state; these states include on-line/off-line, locked/unlocked as well as replicating, mirror synchronization, and backup in progress. A virtual cabinet or an individual drawer can be online or offline indicating that it is accessible or not. Additionally, they may be locked or unlocked indicating that for some administrative purpose the drawer is not accessible to a particular user/group or to the entire enterprise.

Associated with the virtual cabinet 21 is a set of cabinet policies relating to version control of files, security access, deletion, file archiving, and so forth. Further, associated with each drawer is a set of policies relating to that drawer. Some examples of policies for each drawer are set out herein below.

Referring to FIG. 3a, a simplified block diagram of a system 30 having a virtual volume 31 in the form of a virtual storage space, and virtual filing cabinets 32 defined therein is shown. A lifecycle of a file stored within a virtual drawer is controlled in a fashion that makes use of policies of that drawer, of the virtual cabinet in which the drawer is located and of the virtual volume. In combination, these policies define a set of policies for governing files in the specified virtual drawer 33. Typically, the files within a single virtual cabinet 32 are inside a single virtual subdirectory, but this need not be so. Additionally, the files within a single virtual drawer 33 may be inside an associated single virtual subdirectory, but this need not be so.

Individual data files are stored within virtual drawers 33. These drawers 33 expand and shrink dynamically and are typically constituted by a homogeneous media type. Besides storage, virtual drawers 33 are also defined for other purposes such as caching, redundancy control (such as backup, mirror & replica), file recycling and offline media management, as well as recycling. For example, the caching drawer 21 would reflect a storage medium providing high performance such as RAM.

Figure 3B:
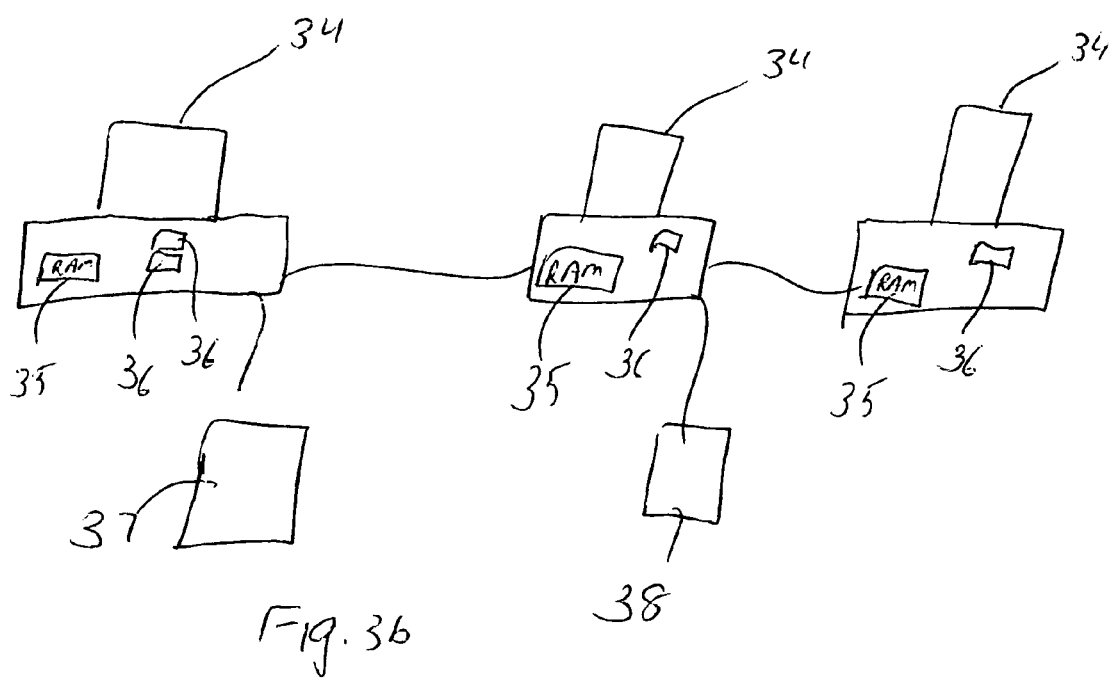

Referring to FIG. 3b a physical system is shown comprising different storage media for storing different data within different drawers. A network is shown comprising a plurality of computer systems 34. Each system includes RAM 35, non-volatile storage devices and so forth. The non-volatile storage devices include hard drives 36, magneto optical drives 37, CD ROM writers 38, DVD with its different flavours of DVD-RAM, DVD-ROM, DVD-R, DVD-RW, DVD+RW, etc. as well as flash disks, tape and other forms of storage. Each physical device is associated with one or more cabinets and with one or more drawers.

Figure 4:
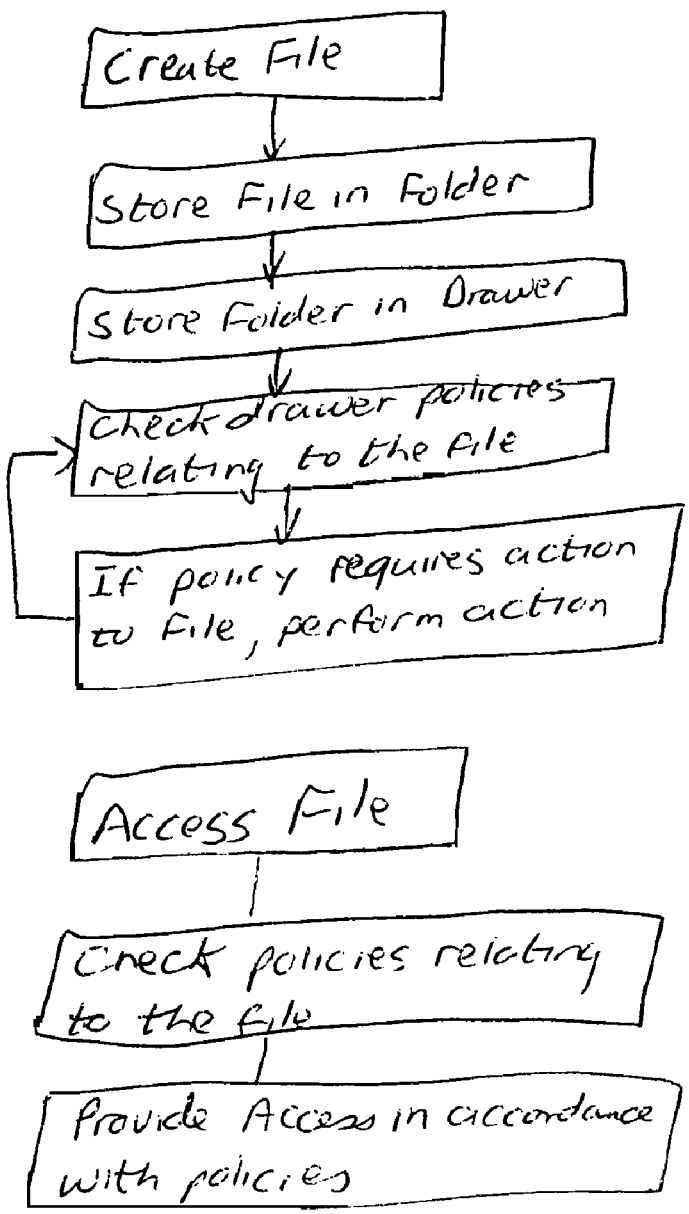
FIG. 4 is a simplified flow diagram of a method of file lifecycle management.

Referring to FIG. 4 a simplified flow diagram of a method of file lifecycle management is presented. The goal of file lifecycle management is generally to control a file from its inception, throughout all stages of its existence. If a lifecycle management system is complete, it safely ensures information availability and simultaneously provides a cost effective storage location for each file, according to predefined administration policies. The life cycle of the file could include policies that determine when it will expire and at the administrators discretion be automatically disposed of and deleted securely or moved to the recycle bin.

Each virtual cabinet contains general policies to be applied for the files under its control; in turn, each Virtual Drawer in a cabinet includes further rules for administering files in its domain. Further, it is possible that within a virtual storage space, there are high-level policies that apply to all files.

A file is created and placed within a file folder. The file folder is similar to those known in the art and, typically, relate directly to directories. The drawer typically relates to a higher-level directory. The drawer has policies, which include policies of the cabinet and may further include system level policies such as those of the virtual volume and so forth. These policies are used to evaluate a lifecycle stage of a file within the drawer and to determine a subsequent drawer where the file folder will be stored within the virtual cabinet. Upon storage of the file within a folder within the drawer, the policies are monitored, as is the file to determine when each or any policy is applicable. When a policy is applicable, it is applied to the file or to the drawer as required. The use of storage cabinet or drawer is completely transparent to the user. As far as the user is concerned the file is stored in a particular directory on a particular drive. Internally to the system the file may redirected to an entirely different location and may even be split across different devices across the network. The internal directory structures as well all the policy enforcement and file management is handled and maintained according to the inventive method (metadata).

Similarly, in the other portion of the flow diagram of FIG. 4, a file is accessed. Upon the file being accessed, the policies are checked to determine any that relate to files being accessed that are within the drawer. Those applicable policies are implemented and the policies of the drawer are maintained. Of course, numerous other actions may trigger policies. Typical examples of these include deleting files, moving files, copying files, and so forth. Each of these actions may be considered a file access operation.

In essence, implementation of policies allows for automated file lifecycle management. For example, a virtual cabinet is constituted by virtual drawers and sets of rules. The rules relate to aspects of file lifecycle management. Some examples of policy areas and implementations are set out below.

File retention policies are one of the most important aspects of file lifecycle management. These policies determine how files are removed from a system. For example, in Windows 98® a file, when deleted from a hard disk drive is placed in a recycle bin from which it is only removed when the recycle bin is emptied. Though this provides convenient retrieval of accidentally deleted files, it is not akin to file lifecycle management.

For example, using policies, a cause and a respective action are set out. For file retention, these actions include file deletion, file deletion with security to prevent retrieval, file archiving, file locking to prevent deletion, moving a file to a different drawer and so forth. A typical file retention policy for the virtual cabinet of FIG. 2 is as follows:

Cache Drawer: If file is saved, transfer file to online one (drawer 23).
Online One: If file is not accessed for 30 days transfer to MO One (drawer 24).
  If file is deleted, transfer to Recycle Bin (drawer 25).
MO One: If file is not accessed within 30 days,
  Store the file on a removable WORM storage medium.
  If file is accessed more than 5 times within 30 days,
Transfer file back to online one (drawer 23).
Recycle Bin: If file is not restored in 30 days,
  Store file on a non-volatile storage medium and delete.

Here, a file is stored in the cache until it is saved or it may be saved to any other drawer according to a predefined policy. Once saved it is placed in the file drawer automatically. It remains there during use. Once the file is not accessed for a period of time, the file is transferred to an MO drawer where it is stored in a less conveniently accessible medium. It remains there during a period of intermittent use. Should the file be used often, it will be transferred back to one of the more accessible drawers such as the active file drawer 23. When no use of the file is made for a period of time, it is archived. Archiving of the file takes the form of transferring it to a removable medium. This operation may take place at intervals depending on the size of the removable media, the size of the organisation and the size of the virtual cabinet. As noted, even deleted files may be archived for later retrieval according to the invention. By maintaining an index of files and their locations, it becomes a simple matter to find a file whether deleted, archived, or active.

Though the above example is quite simple, far more complex file management policies are possible. For example, some files may be deleted without archiving. These would include highly secure files, which are subject to secure deletion, personal files that are not necessary for the company operations, and so forth. Also, some files that are replaced may be deleted in order to replace same instead of simply accessed and modified. Another added variable is time. Files may be "non-volatile" for a period of time after creation or during certain times of day. This would prevent an after-hours assault on a computer network from damaging files stored thereon.

Recycle bin retention is another policy-based issue. It may be desirable to maintain an index of all files deleted from a recycle bin, or this may be unnecessary. If necessary, the index is stored as part of the recycle bin and may itself be archived at intervals or when of sufficient size to free up space in the recycling bin drawer 25. Other variables affecting policies include size capacity and a number of files relating to each drawer.

Another policy that affects either a cabinet or its drawers is the quota on user space. Quotas are enforced on a user basis. This is based on a unique User or Group identifier. A maximum amount of storage space and a maximum quantity of files is controllable. This Quota may be enforced at different levels such as, on a drawer-by-drawer basis or on a cabinet wide basis or even on an entire virtual volume basis.

As such, the functions currently handled manually by each individual user of a system are handled automatically. Since archiving storage media are cheaper than active storage media, the system results in considerable cost savings. Further, since none must waste time in ensuring the policies of the virtual cabinet, in contrast to a file clerk who performs these functions for physical file cabinets, there is cost savings in the policy based organisation structure.

In the exemplary embodiment, a messaging system is implemented to route error and other messages to appropriate entities. An example of the problem is as follows: if a file is not accessed for 30 days and is being transferred to the archiving drawer 24 and an error occurs, who gets the error message?

Notification of breach of security attempts as well as operator requests are routed to the designated entities according to pre-defined policies. These policies are modified and managed by designated personnel. Notification policies are optionally defined for each of the actions taken by the system to enable auditing, trouble shooting, configuration management as well as system optimization. The notification process allows for numerous notification messages across different protocols with varying levels of severity to be declared for different errors and warnings. For example, the offline media management process optionally has one of a number of pre-defined policies;

If a specific user or user group requests access for a file that is located on a media that is currently offline then
    Pause the request indefinitely;
        Notify the user that the file is currently is offline or not,
        Allow the user to cancel the request,
        Notify the operator or administrator that there is an outstanding request for an offline media when applicable,
        Allow the administrator or operator to cancel the request,
        Notify the user that the request was cancelled when applicable,
    But this need not be so.
    Pause the request for a specified time period:
        Notify the user that the file is currently offline when this is so,
        Notify the user of the request time out period when applicable,
        Allow the user to cancel the request,
        Notify the operator or administrator that there is an outstanding request for an offline media,
        Allow the administrator or operator to cancel the request,
        Notify the user that the request was cancelled,
        If the request timed out then;
            Notify the operator or administrator that there is an outstanding request for an offline media that timed out,
            Notify the user that the request timed out,
Of course other variations are also applicable and user notification is often optional as is the option to cancel a request.
    Fail the request immediately:
        Notify the user that the file is currently offline and inaccessible,
        Notify the operator or administrator that there was a cancelled request for a file located on an offline storage media,
        Notify the user that the request was cancelled, Therefore, these errors are trapped and are passed onto an administrator of the cabinet or of the virtual volume. Messages may also be routed to users/groups according to pre-defined policies. A hierarchy of notifications is typically implemented to determine whom to notify. An example of a hierarchy is operators, file owners, group administrators, drawer administrators, cabinet administrators, and volume administrators. Also, notification to other parties such as individual users is possible based on policies and a status of a requested file or file operation. Optionally, notification is sent to the user requesting the file(s) irrespective of the operating environment.

In the virtual cabinet of FIG. 2, there is shown an offline drawer 26. Offline media require management policies of their own. In particular, those virtual drawers that may be offline, need policies relating to that event. This is analogous to physical drawers that may be locked. When the drawer is locked, provision is made for files outside the drawer belonging therein and for files within the drawer that are needed.

Before setting a drawer offline, policies are reviewed to determine that the drawer is one supporting offline activity and that according to preset policies; the drawer can be taken offline at present. Similarly, policies are verified before a drawer that is offline is returned to online operation. These policies may be significantly more complex than a lock and key scenario. A drawer may automatically go off line in some situations—security breaches, too much activity, reorganisation, etc. That same drawer may require certain events before returning online. In the case of security concerns, an indication from a trusted individual that security concerns are not real is commonly required. This may require a password or some other identification code. Even once restored, the restoration may not restore the drawer to full information accessibility as before. There may be time periods of partial availability or other policies to enhance security or to improve performance.

Preferably, information is logged relating to virtual cabinet operations for later -use in trouble-shooting, tune-up and optimization purposes.

Another drawer (not shown) is a Mount-point drawer or cabinet reflecting data for retrieval from a communication medium in the form of the Internet. This drawer/cabinet may have, for example, known world wide web information addresses stored therein indicative of information location(s) for retrieval. Thus, accessing this drawer/cabinet provides a user with commonly available but updated information such as exchange rates, associated company data for contacting them, weather and traffic information and so forth. Instead of storing this data locally, it is stored on the World Wide Web but accessed as if it were in the local electronic file cabinet. Typically, this data is not managed using the lifecycle management method of the virtual cabinet/drawer since it is drawn from somewhere else, from a system belonging to someone else. That said, the inclusion of the data in a local virtual drawer/cabinet is beneficial in simplicity of access and up to date information content.

Another virtual cabinet may be a Read-Only cabinet that may contain data created outside the context of the virtual volume/cabinet/drawer. This data could be contained on distribution media such as CD-ROM/CD-R/DVD-R/DVD-ROM. Such a cabinet would be in a read-only state, even though it might contain a cache drawer as well as an offline media drawer and potentially a number of read-only drawers. This implies that data contained on such read-only media may be indexed, cross-referenced and cached by the virtual volume for quick access and incorporated into the virtual volume.

Though a virtual drawer is described as being entirely within a single virtual directory, this virtual directory could be a single physical directory. Alternatively, the files are inside a single physical subdirectory absent a virtual directory. Further alternatively, the files are inside a plurality of physical and virtual subdirectories.

In an alternative embodiment, the file cabinet is formed of physical volumes instead of virtual volumes wherein a cabinet is comprised of a plurality of drawers each associated with a physical storage device.

In an embodiment, many Virtual Cabinets may share a single Virtual Drawer. As such, using any of several virtual cabinets provides access to a same virtual drawer. This allows for system load balancing wherein virtual drawers are shared to allow a predetermined amount of load on each physical storage device within each virtual device. As such, portions of a physical storage device are associated with different drawers in order to balance the load such that access to the drawers is optimized for speed.

Because of the structure of the virtual cabinet, existing data stored on electronic media is easily incorporable within newly created virtual volumes and virtual cabinets.

Figure 5:
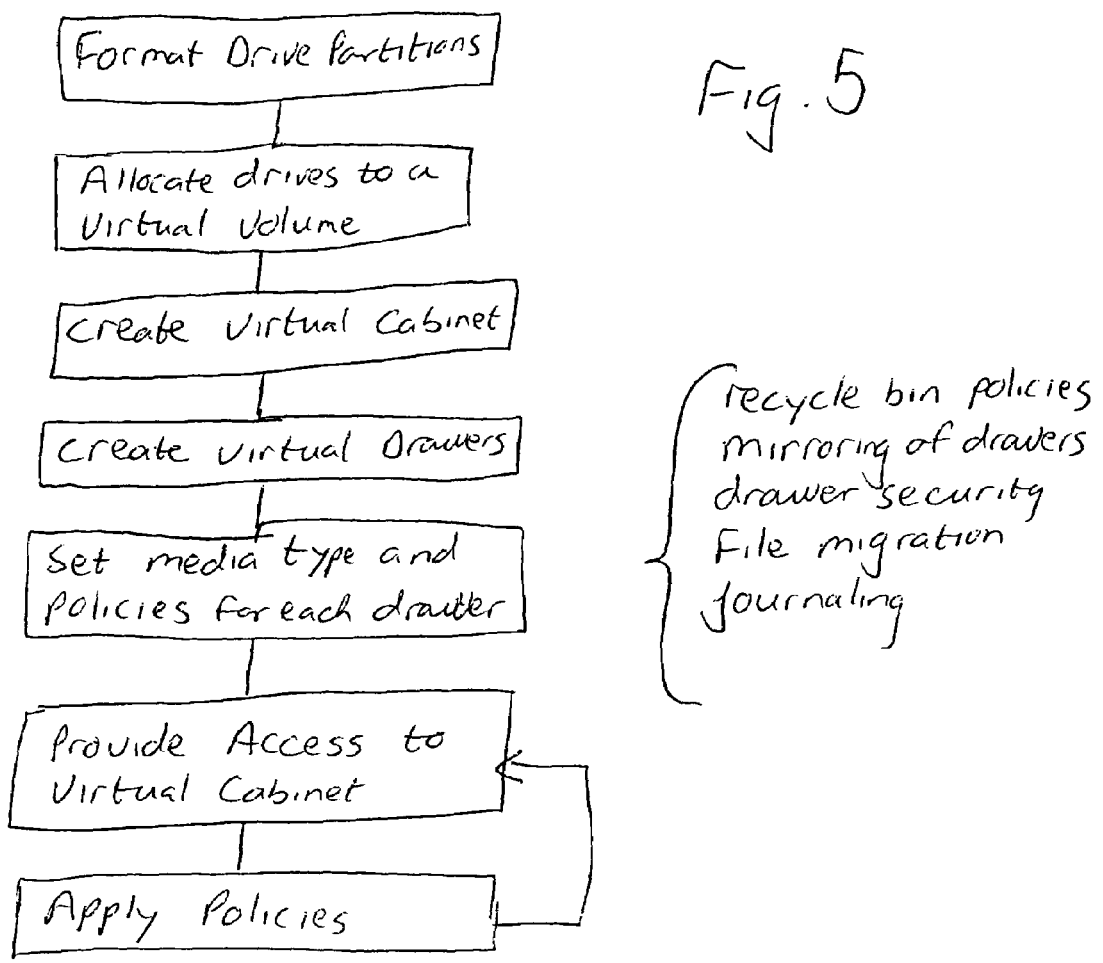
FIG. 5 is a simplified flow diagram of an implementation of the system for Windows NT®; and, FIG. 6 is a simplified flow diagram of a method of using retention dates to track file lifecycles.

Referring to FIG. 5, a simplified diagram of an implementation of the system is shown. Here all native file system features are supported, but this need not be so. The filing cabinet has tremendous expandability. When using 64 bit addressing the virtual volume is expandable to $2^{64}-1$ partitions and files. This is a very large number. Expansion of the volume or of the cabinets or drawers optionally takes place on the fly or on demand.

Partitions are formatted in the native file system format such as NTFS and are allocated from an appropriate Media Pool, but this need not be so.

Administrative processes allow for compacting of information on members. Empty media remain allocated to the virtual volume. Optionally, these members may be automatically or manually removed once emptied, depending on a pre-defined policy.

Further administrative options allow definition of different techniques to optimize removable media usage, balancing between performance and storage space utilization such as selecting options, i.e.: always write contiguously—split to utilize available space—split only when file size exceeds media size. Specialized caches for read, write or both operations are provided.

Each virtual volume supports pre-migration techniques for off-peak hours and pre-fetch techniques for improving scheduling.

The implementation supports several storage types including:

Fixed: Hard disk partitions—RAID, Flash disks. (SCSI, IDE Fibre Channel, etc.)

Removable: MO—WORM—DVD-RAM—DVD-ROM—DVD-R—DVD+RW—Tape

A local or remote server provides these services. The complete range of native operating system security features are supported. Further security features relating to policies of the virtual cabinet are also supported. The native operating system security features and the policies are enforced at a file level and a directory level.

The invention supports mirroring merely by setting mirroring policies for particular drawers. This is typically achieved using two or more physical media for storing identical data. Of course, the use of an archiving medium and a cache allows for data to be mirrored in an archiving medium during use without slowing performance of the system. Similarly, should a portion of the storage medium fail, the mirrored data is retrieved from the archiving storage medium into the cache for rapid access. Mirroring is neither limited nor confined to different drawers of different media types, but rather is a policy that allows files to be mirrored to similar typed drawers as well or instead.

Further, the archiving storage device is then an accurate replica of the data that is useful as an archive or for data transfer. Further, the use of several archiving storage media is supported to form a plurality of replicas on different media. Optionally, replication is performed between drawers of a same type enabling the files to be accessed at all times with same identical performance.

Optionally, a journaling file system is implemented to make rebuilding of data for faster recovery in case of storage device failure. Preferably, concurrent access is provided during data rebuild. Alternatively stated, as data is being scanned, already parsed information is available to users, typically, in a read-only state. The basic concept of metadata regeneration is achieved by reconstructing the metadata from the individual components that make up the virtual drawers/cabinets and virtual volumes. The metadata is replicated, either partially or fully, through out the virtual volume on the individual components, allowing the metadata to be regenerated in its entirety from these components, but this need not be so. The metadata may be replicated or even mirrored on the local server or across the network to another set of storage components, perhaps an identical set to the original, that would provide plurality of access and enhance performance and provide a redundant fail over mechanism.

Figure 6:
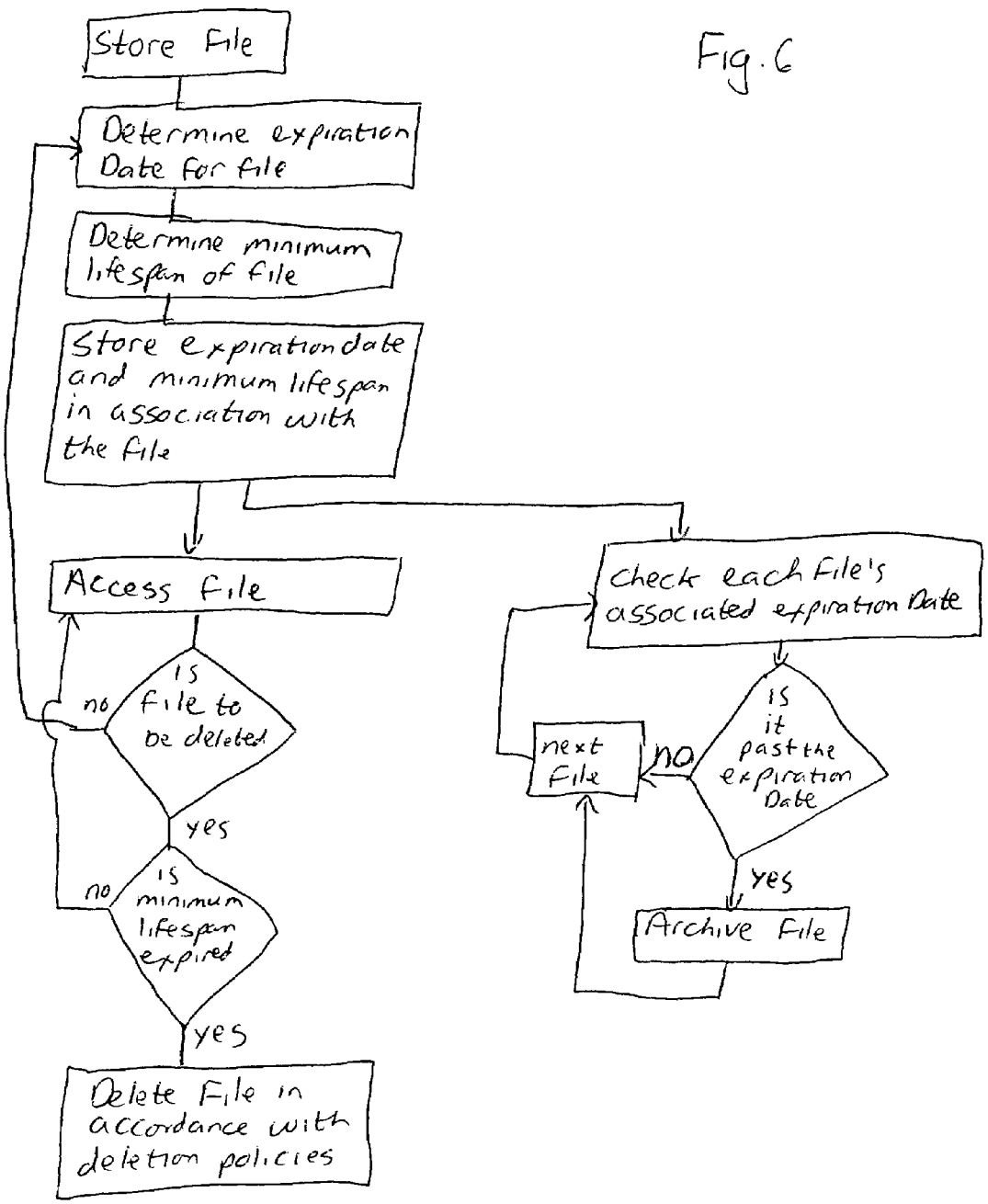

Referring to FIG. 6, a simplified flow diagram of a method of using retention dates to track file lifecycles is shown. File expiration dates are stored in association with each file. The expiration dates are indicative of a minimum time before deletion, if any; a date on which to delete the file; and any policies relating to the deletion such as archiving or moving the file to other storage media and so forth. Retention policies within a drawer effect the expiration dates. For example, every time a file is accessed, the retention date is updated The update may differ depending on the access type—read, write, copy, etc.—or may remain the same across all access functions. Also, the policies are capable of supporting distinctions based on user identifications, file types, security levels, and so forth. Another example would allow files that are no longer required for the organization to expire after they reached the legal statute of limitations to be disposed of automatically without delay.

The pseudo file system uses expiration dates on files to track the use of the file. The expiration dates aid the disposal of seldom-used files, selecting them to be backed up and/or deleted from the virtual drawer. A minimum and a maximum retention period are specified for the files in the volume.

To determine the expiration date of a newly created file the maximum retention time value is added to the current time, and every time the file is accessed or modified its expiration is updated with a minimum retention time value+current time if it is after the previously stored expiration date. On the other hand expiration policies could be defined to allow files to expire based on strictly the creation date, but this need not be so.

Similarly, a volatility period for a file is selectable during which a user is unable to delete the file. Optionally, the volatility period is stored with an indication preventing renaming of the file when set and allowing it when cleared.

Also, with each file are stored policies on file deletion within the scope of those policies supported by the virtual drawer. Policies for file deletion include the following: delete with security; delete without security; delete with archive; prevent deletion but allow renaming; prevent deletion prevent renaming; send to recycle bin; maintain version control data; and delete prior versions.

Version control is a significant aspect of file lifecycle management. When a file is modified, a new version is created. The newer version may be created by duplicating and modifying the previous file and maintained as a completely intact file or as a differential file relative to the previous version of the file. The previous version is typically discarded —replaced or deleted. This need not be so. Policies on file retention can maintain previous versions and if so desired, will maintain a list of previous versions including when last modified and by whom. These old versions are typically stored throughout the virtual cabinet and exist in any drawer, according to the governing policies that are set by an administrator. Users may have access to only the most recent version of a file, but this also need not be the case. Policies may limit a number of generated versions or an interval between new versions in order to limit storage requirements.

Typically, when version control is enabled, only a last file version is available other than by special request. When a file is opened for writing, a modification flag is maintained to ensure that new information has been written to the file. This reduces the amount of versions saved by eliminating those reflecting no changes. If the flag is set, a new version of the file is created—a copy—and the data is stored in this new file. Typically, a version identifier is maintained as a sequential number included in the file ID and is incremented every time a new version is created. Of course, other forms of version numbering such as date and time and so forth are also possible. Preferably, in the file properties list, the history of modifications to a file stored through version control appears. Depending on the governing policies set by the administrator and the underlying operating system, the different versions of the file may be visible to the user but this need not be so.

Another version control policy is Selective/discretionary version control. Selective version control is a suitable file retention policy to thin versions of a file based on age such that, for example, one version per week is stored for versions over one month old and one version a day is stored for versions over a week old and one version an hour is stored for versions less than one week and over one day, and finally all versions are stored for the last day. By selectively reducing the number of versions maintained, storage requirements do not balloon while, for most applications, reasonable version control is maintained.

Of course, once the file is moved to the archiving drawer 24, the older versions are archived since they are unlikely to be accessed. Similarly, if the file is moved to the recycle bin, the older versions may be archived, deleted, or moved to the recycle bin with the file.

The invention embodies a complete suite of access rights that any administrator may define which will be enforced by the system. They allow the administrator to specify who can perform a specific administrative task if any, and who will get notified in the case of a particular event or for all events and how. The enforcement of access rights may be completely or partially disabled at the administrator's discretion, or who ever is designated with the privilege to do so. Every aspect of the system is configurable.

Numerous other embodiments may be envisaged without departing from the spirit or scope of the invention.

Appendix A

Virtual Volume
   Name
   Volume Label (Same as Name)
   Metadata Information (partition list)
   Data Members (partition list)
   Space available—Maximum number of files
   Scan Parameters (schedule info)

Virtual Cabinet
   Name=Subdirectory name (always linked to the directory ID)
   Path Selector (where the VC is located)
   File Retention Policies
   Automatic Deletion
   Prevent Deletion (Access Control Rules)
   Recycle Bin
   Version Control
   Movement Rules between Virtual Drawers
   Move from Source-DR to Destination-DR files in <criteria>.
   <criteria>::=
   Any File
   Include only files that match (Age, Size, Attributes, File-Mask, User/Owner/Creator) [alo]
   All files, excluding files that match (Age, Size, Attributes, File-Mask) [alo]
   Age:
      n days since (CRT, LMT, LAT)
   Attributes:
      Read-Only/Archive/Hidden/System/Compressed (disabled)
   Size:
      Files smaller than n [size unit]
      Files larger than n [size unit]
   File-Mask:
      Name pattern/extension pattern
   User/Owner/Creator
      Files created by a particular user or Group
      Files whos ownership is currently held by a specific user or user group
   File will always be created in one of the virtual cabinet's drawers according to a pre-defined policy.

Virtual Drawer
  Name
  Server:
  Local/Remote
  Class:
  Class: Cache—Storage—Mountpoint
  Function:
  Primary Storage—Recycle—Replica—Backup—Mirror—Archive—Offline Media
Type
  Fixed/Removable (Online—Nearline)
  Media:
  Magneto Optical/WORM/DVD-RAM/DVD-ROM/DVD-R/DVD+RW/TAPE/CD-ROM/CD-R/FLASH/RAM
  Replication/Mirroring
  Drawer Access Mode (Read/Write (RW), Read-Only (RO), Archive Mode [AM])
  Primary Media Pool
  Rules for taking Offline (weighting factors, automatically, etc.)—Storage location
  Rules for Restoration (messaging thru Notification Mgr)
  Status:
  Online—Offline—Locked—Unlocked—Mirror-Synchronization—Replication-In-progress—Backup-In-progress—Accessible—Inaccessible
  Shared:
  Private—Public

What is claimed is:

1. A computer-implemented method of managing a file lifecycle, the method comprising the steps of storing data on a storage medium comprising:
 associating a set of lifecycle policies with a file in a file system, wherein said lifecycle policies relate to aspects of file classification and file disposition including at least one of: file creation, file retention, file reference, file non-use, file security, file protection, file preservation, file storage locations within a storage medium, cost effective storage of a file, or file expiration;
 storing said file on said storage medium accessible by a computer according to said set of
lifecycle policies;
 automatically determining from the associated lifecycle policies whenever said file is to be moved;
 automatically moving said file according to the associated lifecycle policies to another storage location within said storage medium or within a different storage medium whenever the associated lifecycle policies determine that said file is to be moved; and
 receiving an access request for said file from an application;
 providing transparent access to said requested file based on said associated set of lifecycle policies, regardless of where said file is located, and independently of said application requesting access to said file.

TABLE 1

VIRTUAL VOLUMES: PROPERTIES - ATTRIBUTES - POLICIES

| Virtual Volumes | Virtual Drawers | Virtual Cabinets | Virtual Drawers in a Virtual Cabinet |
|---|---|---|---|
| Name = Volume Label | Name | Name = Subdirectory | Movement Rules |
|  | Control: Native-Foreign | Path Selector(s) | Recycle Bin Policies |
| Scan Parameters | Location: Local-Remote |  | Cache Policies |
| User/Group Quotas | Class: Cache - Storage - Mountpoint | Automatic Deletion Policies | Scan Policies |
|  | Type: Fixed - Removable | Version Control Policies | User/Group Quotas |
|  | Media: HD - FLASH - MO - WORM - CD-R - CD-ROM - DVD-RAM - DVD-ROM - DVD-R - DVD+RW - RAM - TAPE | Access Mode: Read/Write - Read-Only - Archive Mode |  |
|  | Access Mode: Read/Write - Read-Only - Archive Mode | Security Deletion Policies |  |
| Status: Online - Offline - Locked - Unlocked - Mirror-Synchronization - Replication-In-progress - Backup-In-progress - Accessible - Inaccessible | Status: Online - Offline - Locked - Unlocked - Mirror-Synchronization - Replication-In-progress - Backup-In-progress - Accessible - Inaccessible | Status: Online - Offline - Locked - Unlocked - Mirror-Synchronization - Replication-In-progress - Backup-In-progress - Accessible - Inaccessible |  |
|  | Primary Media Pool Shared or Not shared | Type: Virtual Directory - Mount-point/Symbolic-link |  |
|  | Default Storage Location Function: Primary Storage - Recycle - Replica - Backup - Mirror - Archive - Offline Media |  |  |
|  | Share: Public - Private Taking Offline Policies Restoration Policies High/Low Watermarks Drawer Direct Access (Read/Write) | User/Group Quotas |  |

2. A method of managing a file lifecycle according to claim 1 comprising the steps of:
providing a plurality of storage media including the storage medium, each having associated therewith a set of lifecycle policies, the policies such that when a condition is met the file is transferred from one storage medium to another in accordance with a lifecycle stage of the file.

3. A method of managing a file lifecycle according to claim 2 wherein a first storage medium is associated with active files and a last storage medium is associated with archived files and wherein the file is transferred from the first storage medium to the last storage medium in successive stages.

4. A method of managing a file lifecycle according to claim 3, wherein a file is automatically transferred to a storage medium most appropriate for its stage of lifecycle determined in accordance with the lifecycle policies.

5. A method of managing a file lifecycle according to claim 4 wherein the lifecycle policies relate to at least some of: the associated storage medium, the file name, the file extension, the file creation date, the file access date, the file last access date, the file creator, and/or the current file owner.

6. A method of managing a file lifecycle according to claim 1 wherein the step of storing the file on a storage medium comprises the step of determining, in accordance with the lifecycle policies, expiration data relating to when the file is to be moved.

7. A method of managing a file lifecycle according to claim 6 wherein the step of automatically determining when the file is to be moved comprises the step of comparing the expiration data to present time data to determine if it is indicative of the file having expired its time on the storage medium or on the entire system.

8. The method of claim 1, further comprising:
providing a virtual cabinet having a plurality of virtual drawers, where each virtual drawer is associated with at least one storage medium, and when a single drawer is associated with a plurality of storage media, said associated storage media are of a similar nature to each other;
providing a plurality of lifecycle policies, a lifecycle policy associated with each virtual drawer;
storing the file in a virtual drawer by storing the file on at least a storage medium associated with the virtual drawer;
at intervals, determining from the lifecycle policy associated with the virtual drawer an action dictated by the lifecycle policy; and, performing the dictated action on the file.

9. A method of managing a file lifecycle according to claim 8 wherein the action includes the step of deleting the file from the virtual drawer.

10. A method of managing a file lifecycle according to claim 9 wherein the lifecycle policies relate to the storage medium and to dates stored in association with each file.

11. A method of managing a file lifecycle according to claim 10 comprising the step of:
storing in association with each file an expiration indicator indicative of when the file is to be transferred.

12. A method of managing a file lifecycle according to claim 11 wherein the expiration indicator includes a date on which to delete the file from the drawer in accordance with the action dictated by the lifecycle policy.

13. A method of managing a file lifecycle according to claim 11 wherein the expiration indicator includes a minimum time before which the file is to be maintained in its current drawer.

14. A method of managing a file lifecycle according to claim 9 wherein the action includes the step of transferring the file from the virtual drawer to another different virtual drawer within the cabinet.

15. A method of managing a file lifecycle according to claim 14 wherein step of transferring the file includes the step of archiving the file within an archiving virtual drawer.

16. A method of managing a file lifecycle according to claim 9 wherein step of deleting the file includes the steps of determining based on a drawer policy associated with the drawer and based on data stored in association with the file a mode of deletion, and deleting the file in accordance with the determined mode.

17. A method of managing a file lifecycle according to claim 16 wherein the modes of deletion include secure deletion and insecure deletion.

18. A method of managing a file lifecycle according to claim 8 wherein files stored in the virtual cabinet are stored within a same virtual storage medium and wherein files stored within each drawer from the plurality of virtual drawers are stored on the one or more similar storage media associated with said drawer.

19. A method of managing a file lifecycle according to claim 18 wherein a single virtual drawer forms part of a plurality of virtual cabinets.

20. A method of managing a file lifecycle according to claim 8 wherein the step of determining an action comprises the steps of:
determining from the lifecycle policy a condition;
evaluating each file to determine a presence of the condition; and,
when the condition is met, providing an action associated with the condition as the determined action.

21. The method of claim 1, further comprising the steps of:
providing a virtual cabinet having a plurality of virtual drawers, where each virtual drawer is associated with at least one storage medium, and when a single drawer is associated with a plurality of storage media, the associated storage media are of a similar nature to each other;
providing a plurality of lifecycle policies, a lifecycle policy associated with each virtual drawer;
storing the file in a virtual drawer by storing the file on at least a storage medium associated with the virtual drawer;
upon receiving an access request to access the file, determining from the lifecycle policy associated with the virtual drawer an action dictated by the lifecycle policy; and,
performing the dictated action on the file.

22. A method of managing a file lifecycle according to claim 21 wherein the determined action comprises the step of:
storing in association with each file an expiration indicator indicative of when the file is to be transferred, the expiration indicator determined based on the lifecycle policy.

23. A method of managing a file lifecycle according to claim 22 wherein the expiration indicator includes a date on which to delete the file from the drawer in accordance with the action dictated by the lifecycle policy.

24. A method of managing a file lifecycle according to claim 22 wherein the expiration indicator includes a minimum time before which the file is to be maintained in its current drawer.

25. A method of managing a file lifecycle according to claim 21 wherein the action includes the step of transferring the file from the virtual drawer to another different virtual drawer within the cabinet.

26. A method of managing a file lifecycle according to claim 25 wherein step of transferring the file includes the step of retrieving the file from an archiving virtual drawer and storing it in another virtual drawer.

27. A method of managing a file lifecycle according to claim 21 comprising the steps of determining based on a lifecycle policy associated with the drawer and based on data stored in association with the file whether the file is to be deleted;
  determining based on a lifecycle policy associated with the drawer and based on data stored in association with the file a mode of deletion for the file; and
  deleting the file in accordance with the determined mode.

28. A method of managing a file lifecycle according to claim 27 wherein the modes of deletion include secure deletion and insecure deletion.

29. A method of managing a file lifecycle according to claim 21 wherein files stored in the virtual cabinet are stored within a same virtual storage medium and wherein files stored within each drawer from the plurality of virtual drawers are stored on the one or more similar storage media associated with said drawer.

30. A method of managing a file lifecycle according to claim 29 wherein a single virtual drawer forms part of a plurality of virtual cabinets.

31. A method of managing a file lifecycle according to claim 21 wherein the step of determining an action comprises the steps of:
  determining from the lifecycle policy a condition;
  evaluating the accessed file to determine a presence of the condition; and,
  when the condition is met, providing an action associated with the condition as the determined action.

32. The method of claim 1, wherein said storing said file comprises the steps of:
  requesting a file to be stored in a virtual cabinet in a virtual volume;
  evaluating file storage criteria based on cabinet policies of the virtual cabinet to determine a physical location wherein the file is to be stored; and,
  storing the file in the determined physical location.

33. A method of managing a file lifecycle according to claim 32 wherein the cabinet policies relate to file types of the file to be stored.

34. A method of managing a file lifecycle according to claim 33 wherein a virtual cabinet comprises a virtual drawer and wherein a virtual drawer forms part of more than one virtual cabinet.

35. A method of managing a file lifecycle according to claim 34 wherein the virtual cabinet forms a context within a context based file lifecycle management system and wherein a file created within a context of a virtual cabinet being subject to the policies of said virtual cabinet.

36. A method of managing a file lifecycle according to claim 32 wherein the step of storing the file comprises the step of storing the file in association with the virtual cabinet.

37. A method of managing a file lifecycle according to claim 36 wherein the file is governed by policies of the associated virtual cabinet and wherein some actions dictated by those policies are performed on the file throughout its lifecycle.

38. The method of claim 1, wherein said storing said file comprises the steps of:
  selecting a virtual drawer within a virtual cabinet;
  requesting a file to be stored in the virtual drawer;
  evaluating file storage criteria based on lifecycle policies associated with the virtual cabinet; and
  in accordance with the file storage criteria, storing the file in association with the virtual cabinet.

39. A method of managing a file lifecycle according to claim 38 wherein the file is stored within the virtual drawer and is accessible within the virtual drawer within each of a plurality of virtual cabinets.

40. A method of managing a file lifecycle according to claim 38 wherein the lifecycle policies relate to duplication of file data within a plurality of files.

41. A method of managing a file lifecycle according to claim 40 wherein the lifecycle policies relate to load balancing for the virtual cabinet based on access to data that is stored in duplicate.

42. A method of managing a file lifecycle according to claim 38 wherein the lifecycle policies relate to one of replication, backup, mirroring, and redundancy of file data storage within the virtual cabinet.

43. A method of managing a file lifecycle according to claim 42 wherein the lifecycle policies relate to load balancing for the virtual cabinet based on access to data that is stored in more than one physical location.

44. A method of managing a file lifecycle according to claim 38 wherein the lifecycle policies relate to version control.

45. A computer-implemented method of managing a file lifecycle, the computer-implemented method comprising the steps of storing data on a storage medium comprising:
  providing a virtual storage medium having a plurality of storage media associated therewith, wherein said plurality of storage media are accessible by a file system in a computer, and having associated therewith a set of lifecycle policies relating to at least one of: file storage locations within at least one of said plurality of storage media, file creation, file retention, file reference, file non-use, file security, file protection, file preservation, cost effective storage of a file, or file expiration, wherein a file lifecycle comprises aspects of file management including: file classification or file storage disposition;
  storing said file on at least one of said plurality of storage media accessible by a computer within said virtual storage medium;
  at intervals, determining from the associated lifecycle policies actions dictated by said lifecycle policies for performance on said file;
  performing said dictated actions on said file;
  receiving an access request for said file from an application: and providing transparent access to said requested file based on said associated set of lifecycle policies, regardless of where said file is located and said dictated actions performed on said file, and independently of said application requesting access to said file.

46. A method of managing a file lifecycle according to claim 45 wherein a first storage medium is associated with active files and a last storage medium is associated with archived files and wherein the file is transferred from the first storage medium to the last storage medium in successive stages.

47. A method of managing a file lifecycle according to claim 46, wherein a file is automatically transferred to a storage medium most appropriate for its stage of lifecycle determined in accordance with the lifecycle policies.

48. A method of managing a file lifecycle according to claim 47 wherein the lifecycle policies relate to at least some of the associated storage medium, the file name, the file extension, the file creation date, the file access date, the file last access date, the file creator, and the current file owner.

49. A method of managing a file lifecycle according to claim 45 wherein the step of storing the file on a storage medium comprises the step of determining, in accordance with the lifecycle policies, expiration data relating to when the file is to be moved.

50. A method of managing a file lifecycle according to claim 49 wherein the step of automatically determining when the file is to be moved comprises the step of comparing the expiration data to present time data to determine if it is indicative of the file having expired its time on the storage medium.

51. A computer-implemented method of managing a file lifecycle, the computer-implemented method comprising the steps of storing data on a storage medium comprising:

provides a virtual storage medium having a plurality of storage media associated therewith, wherein said plurality of storage media are accessible by a file system in a computer, and having associated therewith a set of lifecycle policies relating to file storage locations within at least one of said plurality of storage media, wherein said lifecycle policies relate to at least one of: file creation, file retention, file reference, file non-use, file security, file protection, file preservation, cost effective storage of a file, or file expiration, wherein a file lifecycle comprises aspects of file management including: file classification or file storage disposition;

storing said file on at least one of said plurality of storage media within said virtual storage medium accessible by said computer;

upon occurrence of a triggering event, determining from said associated lifecycle policies actions dictated by said lifecycle policies for performance on said file;

performing said dictated actions on said file;

receiving an access request for said file from an application; and providing transparent access to said requested file based on said associated set of lifecycle policies, regardless of where said file is located and said dictated actions performed on said file, and independently of said application requesting access to said file.

52. A method of managing a file lifecycle according to claim 51 wherein a first storage medium is associated with active files and a last storage medium is associated with archived files and wherein the file is transferred from the first storage medium to the last storage medium in successive stages.

53. A method of managing a file lifecycle according to claim 52, wherein a file is automatically transferred to a storage medium most appropriate for its stage of lifecycle determined in accordance with the lifecycle policies.

54. A method of managing a file lifecycle according to claim 53 wherein the lifecycle policies relate to at least some of: the associated storage medium, the file name, the file extension, the file creation date, the file access date, the file last access date, the file creator, and/or the current file owner.

55. A method of managing a file lifecycle according to claim 51 wherein the step of storing the file on a storage medium comprises the step of determining, in accordance with the lifecycle policies, expiration data relating to when the file is to be moved.

56. A method of managing a file lifecycle according to claim 55 wherein the step of automatically determining when the file is to be moved comprises the step of comparing the expiration data to present time data to determine if it is indicative of the file having expired its time on the storage medium.

57. A method of managing a file lifecycle according to claim 51 wherein the event relates to an amount of free space on the storage medium.

58. A method of managing a file lifecycle according to claim 51 wherein the event relates to an amount of space occupied by files of an individual compared to a quota of space allocated to that individual.

59. A method of managing a file lifecycle according to claim 51 wherein the event relates to at least one of initial storage of a file and modification of said file.

* * * * *